US012624728B2

(12) United States Patent
Funaki et al.

(10) Patent No.: US 12,624,728 B2
(45) Date of Patent: May 12, 2026

(54) CERAMIC BALL MATERIAL, METHOD FOR MANUFACTURING CERAMIC BALL USING SAME, AND CERAMIC BALL

(71) Applicant: Niterra Materials Co., Ltd., Yokohama (JP)

(72) Inventors: Kai Funaki, Yokohama (JP); Hideki Sato, Yokohama (JP)

(73) Assignee: Niterra Materials Co., Ltd., Yokohama (JP)

( * ) Notice: Subject to any disclaimer, the term of this patent is extended or adjusted under 35 U.S.C. 154(b) by 213 days.

(21) Appl. No.: 18/582,824

(22) Filed: Feb. 21, 2024

(65) Prior Publication Data

US 2024/0191753 A1     Jun. 13, 2024

Related U.S. Application Data

(63) Continuation of application No. PCT/JP2023/012411, filed on Mar. 28, 2023.

(30) Foreign Application Priority Data

Mar. 28, 2022     (JP) ................................. 2022-051453

(51) Int. Cl.
*F16C 33/32*          (2006.01)

(52) U.S. Cl.
CPC .......... *F16C 33/32* (2013.01); *F16C 2206/44* (2013.01); *F16C 2206/48* (2013.01);
(Continued)

(58) Field of Classification Search
CPC ... C04B 2235/963; C04B 35/10; F16C 33/32; F16C 2206/44; F16C 2206/48; F16C 2206/56; F16C 2206/60
See application file for complete search history.

(56) References Cited

U.S. PATENT DOCUMENTS 6,464,906 B1 *  10/2002  Niwa ...................... F16C 33/32
                                                                          264/9
6,485,830 B1    11/2002  Komorita et al.
(Continued)

FOREIGN PATENT DOCUMENTS

JP          S60-018620 A      1/1985
JP          H02-214606 A      8/1990
(Continued)

OTHER PUBLICATIONS

International Search Report and Written Opinion dated Jun. 13, 2023 (Application No. PCT/JP2023/012411).
(Continued)

*Primary Examiner* — Hoa (Holly) Le
(74) *Attorney, Agent, or Firm* — BURR PATENT LAW, PLLC

(57)          ABSTRACT

A ceramic ball material according to an embodiment including: a spherical portion; and a band-shaped portion formed over a circumference of a surface of the spherical portion. The ceramic ball material has a ratio Rtb/Rts of 1.0 or more, where Rtb denotes a maximum cross-sectional height of a roughness profile on an outer peripheral surface of the band-shaped portion; and Rts denotes a maximum cross-sectional height of roughness on an outer peripheral surface of the spherical portion.

7 Claims, 3 Drawing Sheets

(52) U.S. Cl.
CPC ...... *F16C 2206/56* (2013.01); *F16C 2206/60*
(2013.01); *F16C 2223/06* (2013.01)

(56) References Cited

U.S. PATENT DOCUMENTS

| | | | | |
|---|---|---|---|---|
| 2023/0332644 A1 * | 10/2023 | Funaki | ...................... | B28B 3/08 |
| 2024/0199495 A1 * | 6/2024 | Funaki | ................... | F16C 33/32 |
| 2025/0066257 A1 * | 2/2025 | Funaki | ................. | C04B 35/584 |
| 2025/0074831 A1 * | 3/2025 | Sano | ......................... | B24B 1/00 |
| 2025/0122904 A1 * | 4/2025 | Sano | ...................... | B24B 11/02 |
| 2025/0326696 A1 * | 10/2025 | Ookubo | ............... | C04B 35/111 |

FOREIGN PATENT DOCUMENTS

| | | | |
|---|---|---|---|
| JP | H06-048813 | A | 2/1994 |
| JP | 2764589 | B2 | 4/1998 |
| JP | 2001-146479 | A | 5/2001 |
| JP | 2001-163673 | A | 6/2001 |
| JP | 2003-137640 | A | 5/2003 |
| JP | 2011-093789 | A | 5/2011 |
| JP | 4761613 | B2 | 8/2011 |
| JP | 2013-209283 | A | 10/2013 |
| JP | 2014-088297 | A | 5/2014 |

OTHER PUBLICATIONS

Extended European Search Report dated Jan. 22, 2026 (Application
No. 23780476.0).

* cited by examiner

H

4

8

9

10

CERAMIC BALL MATERIAL, METHOD FOR MANUFACTURING CERAMIC BALL USING SAME, AND CERAMIC BALL

CROSS-REFERENCE TO RELATED APPLICATION

This application is a Continuation Application of No. PCT/JP2023/12411, filed on Mar. 28, 2023, and the PCT application is based upon and claims the benefit of priority from Japanese Patent Application No. 2022-051453, filed on Mar. 28, 2022, the entire contents of which are incorporated herein by reference.

FIELD

Embodiments described later relate to a ceramic ball material, a method for manufacturing a ceramic ball, and a ceramic ball.

BACKGROUND

Various ceramic materials have properties such as high hardness, insulation, and wear resistance. In particular, fine ceramics with enhanced purity and uniform particle size exhibits properties applicable in various fields of, for example, capacitors, actuator materials, and refractories. Products for ball application are those that takes advantage of the properties of ceramic materials, wear resistance and insulation, and include bearings, jigs, tools, gauges, solenoid valves, check valves, and other valves. Of these, products for bearing ball application are made of ceramic materials such as aluminum oxide, silicon nitride, and zirconium oxide. For example, Japanese Patent Laid-Open No. 6-48813 (Patent Document 1) and Japanese Patent No. 2764589 (Patent Document 2) each disclose a bearing ball made of silicon nitride material, while Japanese Patent Laid-Open No. 60-18620 (Patent Document 3) discloses a bearing ball made of zirconium oxide material.

In the process of manufacturing these bearing ball materials, a method of sintering a green compact is employed. A molding method for obtaining the green compact is press molding using a mold. Generally, the press molding is a method of inserting powder into a cavity between an upper punch 2 and a lower punch 3 and then applying pressure thereto by using a press molding apparatus including the upper punch 2, the lower punch 3 and a die 4 as illustrated in FIG. 1. During the press molding, there must be a gap between a tip 2a of the upper punch 2 and a tip 3a of the lower punch 3 to protect the molds. As a result, a spherical portion and a band-shaped portion are formed in the green compact to be obtained by press molding. For example, Japanese Patent No. 4761613 (Patent Document 4) discloses a bearing ball material including a spherical portion and a band-shaped portion, which is obtained by sintering a green compact with the spherical portion and the band-shaped portion.

A ceramic ball material with a spherical portion and a band-shaped portion after sintering process is polished to form a ceramic ball. The ceramic ball material with the spherical portion and the band-shaped portion is sometimes referred to as a preprocessed ball. For example, the ceramic ball material is polished by mirror finishing with a surface roughness Ra of 0.1 μm or less. The mirror finishing involves machining using surface plate.

In general, ceramic materials have excellent wear resistance but are prone to chipping when strong impacts are applied thereto because the materials are brittle. Although curved surfaces easily release impact, corners are prone to chipping due to impact. Therefore, when the ceramic ball material with the band-shaped portion is machined using surface plate, the polishing time is prolonged because the machining is performed in a restrained manner to reduce the possibility that both shoulders, which are the corners of the band-shaped portion, selectively contact a surface plate, causing chipping.

The present invention solves such problems and provides a ceramic ball material that suppresses damage to ceramic materials during polishing and shorten the polishing time.

DETAILED DESCRIPTION

Hereinafter, embodiments of a ceramic ball material, a method for manufacturing a ceramic ball using the same, and a ceramic ball are described in detail with reference to the drawings.

The ceramic ball material according to an embodiment includes a spherical portion and a band-shaped portion formed over the circumference of the surface of the spherical portion. The ceramic ball material having a ratio $R_{tb}/R_{ts}$ of 1.0 or more, where $R_{tb}$ denotes a maximum cross-sectional height of a roughness profile on an outer peripheral surface of the band-shaped portion; and $R_{ts}$ denotes a maximum cross-sectional height of the roughness on an outer peripheral surface of the spherical portion.

Figure 2:
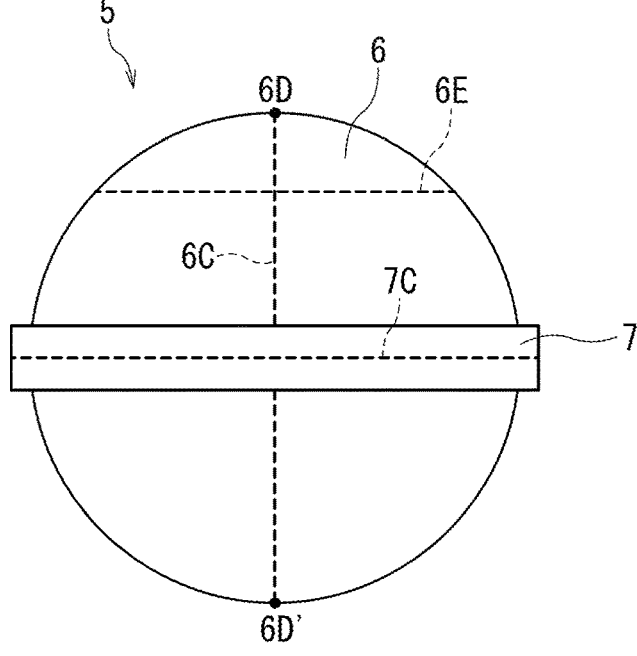
FIG. 2 is an external view illustrating an example of a ceramic ball material according to an embodiment.

FIG. 2 is a schematic view of a ceramic ball material according to an embodiment. In FIG. 2, reference numeral 5 denotes the ceramic ball material according to the embodiment, 6 denotes the spherical portion, and 7 denotes the band-shaped portion. Of the maximum cross-sectional height $R_t$ of the roughness profile, $R_{tb}$ denotes the maximum cross-sectional height of a roughness profile on the outer peripheral surface (outermost surface) of a band-shaped portion; and $R_{ts}$ denotes the maximum cross-sectional height of a roughness profile on the outer peripheral surface (outermost surface) of a spherical portion 6. Reference character W denotes the width of the band-shaped portion 7. The width W of the band-shaped portion 7 is sometimes simply referred to as "width W". In FIG. 2, the seizes of the height and width of the band-shaped portion 7 with respect to the spherical portion 6 are illustrated for the purpose of description.

The ceramic ball material 5 includes the spherical portion 6 and the band-shaped portion 7. The band-shaped portion 7 is formed over the circumference of the surface of the spherical portion 6. The circumference of the surface of the spherical portion 6 may be any one of multiple circumferences of the surface of the spherical portion 6. The surface of the spherical portion 6 being a quadric surface is sufficient. Therefore, the spherical portion 6 may be a true sphere or an ellipsoid. The band-shaped portion 7 is provided on the circumference of the spherical portion 6. The width W of the band-shaped portion 7 is, for example, the largest width of the band-shaped portion 7 but may be the average of widths at multiple positions.

When Rts denotes the maximum cross-sectional height of roughness profile of the spherical portion 6, and Rtb denotes the maximum cross-sectional height of the roughness profile of the band-shaped portion 7, Rtb/Rts, a ratio of Rtb to Rts, is within a range of 1.0 or more. When Rtb/Rts is within this range, the band-shaped portion 7 preferentially comes into contact with an abrasive material as the surface is rough, and thus polishing (e.g., machining using surface plate) proceeds. Since the density of the band-shaped portion 7 of the sintered body is smaller than that of the spherical portion 6, polishing of the band-shaped portion 7 becomes easier, thereby shortening the polishing time during the polishing. Therefore, Rtb/Rts is preferably 1.0 or more, more preferably 1.1 or more, and even more preferably 1.2 or more.

In addition, Rtb/Rts is preferably within a range of 3.0 or less. When Rtb/Rts exceeds 3.0, the maximum cross-sectional height Rtb of the roughness profile of the band-shaped portion 7 becomes large even if the maximum cross-sectional height Rts of the roughness profile of the spherical portion 6 can be controlled. Accordingly, there is a possibility that a chipping defect occurs due to a decrease in the strength of the ceramic ball material 5 with the band-shaped portion 7 or that the convex portion of the band-shaped portion 7 of the ceramic ball material 5 damages the polishing surface plate.

If Rtb/Rts is less than 1.0, the density of the band-shaped portion 7 of the ceramic ball material 5 is larger than that of the spherical portion 6, making the band-shaped portion 7 less easy to polish and increasing the polishing time during the polishing of the ceramic ball material 5. Furthermore, brittle fracture is likely to occur when the band-shaped portion comes into contact with a grinding stone for polishing during the polishing of the ceramic ball material 5. In particular, brittle fracture is more likely to occur in contact of the ceramic ball material 5 with the surface plate for machining using surface plate.

Here, a method of measuring the maximum cross-sectional height Rtb of the roughness profile of the band-shaped portion 7 and the maximum cross-sectional height Rts of the roughness profile of the spherical portion 6 in the ceramic ball material 5 is described. The maximum cross-sectional height Rt of the roughness profile is based on JIS B 0601 (2013) "Geometrical Product Specifications (GPS)—Surface texture: Profile method—Terms, definitions and surface texture parameters".

The maximum cross-sectional height Rt of the roughness profile is measured using a surface roughness measuring machine. The surface roughness measuring machine to be used is SURFCOM2000 manufactured by TOKYO SEIMITSU CO., LTD., and the measurement is carried out using the evaluation and analysis software of the same machine. The measuring apparatus may have an equivalent function.

The measurement distance of the maximum cross-sectional height Rt of the roughness profile, i.e., an evaluation length U, is 10 to 25% of the diameter of the ceramic ball material 5, and the evaluation length U of the spherical portion 6 is the same as that of that of band-shaped portion

7. The measurement conditions are as follows: a measurement cutoff wavelength of 0.08 mm, a Gaussian cutoff type, a least-squares linear correction for slope correction, and a $\lambda$s cutoff ratio of 300. The number of measurements is three, and the measured value is the average of three measurements.

A measurement area of the maximum cross-sectional height Rtb of the roughness profile on the outer peripheral surface of the band-shaped portion 7 has a length corresponding to the evaluation length U at an arbitrary position of a profile 7C. On the other hand, a measurement area of the maximum cross-sectional height Rts of the roughness profile on the outer peripheral surface of the spherical portion 6 has a length corresponding to the evaluation length U at a position centered at 6D (center position, 90° from the profile 7C) farthest from the profile 7C on a profile 6C. Accordingly, even if the ceramic ball material 5 is a perfect sphere or an ellipsoid, similar values can be obtained regardless of position or direction where the measurement is made. In a case where measurement cannot be made at the center position 6D (or the center position 6D') of the spherical portion 6 due to the presence of a defect or the like, the measurement can be performed on the external surface of the spherical cap from a position 6E (45° position) to the center position 6D which is at half the distance from the profile 7C to the center position 6D.

A cross-sectional profile is obtained in a cross-section formed by the profile 7C that extends in the circumferential direction of the outer peripheral surface formed by the band-shaped portion 7 and passes through the center of the outer peripheral surface; and a straight line in the depth direction of the band-shaped portion 7. Then, the maximum cross-sectional height Rtb of the roughness profile on the outer peripheral surface of the band-shaped portion 7 is obtained by removing the shape of the long wavelength (waviness profile) from the cross-sectional profile and calculating the sum of the maximum profile peak height and the maximum profile valley depth at the evaluation length U. In addition, a cross-sectional profile is obtained in a cross-section formed by the profile 6C that passes through the center positions 6D and 6D' on the outer peripheral surface of the spherical portion 6; and a straight line in the depth direction of the spherical portion 6. Then, the maximum cross-sectional height Rts of the roughness profile on the outer peripheral surface of the spherical portion 6 is obtained by removing the shape of the long wavelength (waviness profile) from the cross-sectional profile and calculating the sum of the maximum profile peak height and the maximum profile valley depth at the evaluation length U. It is preferable to exclude 10% of one end portion and 10% of the other end portion in the width direction of the outer peripheral surface of the band-shaped portion 7 from the measurement points because defects such as chipping are likely to occur and affect measured values. The evaluation length U of the maximum cross-sectional height Rt of the roughness profile does not need to be the entire profiles 6C and 7C on the outer peripheral surface, but may be a part (e.g., about 1 mm to 20 mm) of the profiles 6C and 7C.

The spherical portion 6 of the ceramic ball material 5 preferably has an arbitrary diameter of 0.5 mm or more. When the spherical portion 6 has an arbitrary diameter of less than 0.5 mm, it becomes difficult to control a powder press mold for forming the band-shaped portion 7. Thus, the spherical portion 6 preferably has a diameter of 1 mm or more. The diameter is more preferably 2 mm or more.

The ceramic ball material 5 preferably contains any one of aluminum oxide ($Al_2O_3$), silicon nitride ($Si_3N_4$), silicon carbide (SiC), boron nitride (BN), and zirconium oxide ($ZrO_2$) in an amount of 85% by mass or more. The ceramic ball material 5 is made of a ceramic sintered body. The content in the ceramic sintered body is 85% by mass or more of any one of aluminum oxide, silicon nitride, silicon carbide, boron nitride, and zirconium oxide. When the content is 85% by mass or more, the physical properties of the ceramic can be satisfied, and the physical properties required for the ceramic ball can be exhibited. In other words, the ceramic sintered body may contain 15% by mass or less of substances other than those mentioned above. The ceramic ball material 5 preferably contains 85% by mass or more of silicon nitride.

For example, the aluminum oxide sintered body, silicon nitride sintered body, silicon carbide sintered body, boron nitride sintered body, zirconium oxide sintered body, and Alusil sintered body are used as bearing balls. The Alusil sintered body is a sintered body in which aluminum oxide is mixed with zirconium oxide. Among them, bearing balls made of the silicon nitride sintered body have the best wear resistance. For instance, aluminum oxide, zirconium oxide, and Alusil have a Vickers hardness of about 1,200 to 1,700 but a low fracture toughness value of about 3 to 6 $MPa \cdot m^{1/2}$. On the other hand, the silicon nitride sintered body has a Vickers hardness of 1,400 to 1,800 and a high fracture toughness value of 5 to 10 $MPa \cdot m^{1/2}$. The silicon nitride sintered body has both high toughness and Vickers hardness, and is therefore excellent in wear resistance. The silicon nitride sintered body has a structure mainly composed of β-type silicon nitride crystal particles. The β-type silicon nitride crystal particles have long and narrow shapes, in which a high toughness value is achieved by complex-intertwining of long and narrow crystal particles. Although the silicon nitride sintered body has an aspect that the polishing efficiency is very poor due to its high mechanical strength, the polishing efficiency can be improved even in the ceramic ball material 5 made of a ceramic sintered body with high strength, such as silicon nitride sintered body, by increasing the maximum cross-sectional height of the roughness profile of the band-shaped portion 7, as mentioned above.

Next, a method for manufacturing the ceramic ball material 5 is described. The manufacturing method is not particularly limited as long as the ceramic ball material 5 according to the embodiment satisfies the above configuration, but the following manufacturing method is a method for efficiently manufacturing the ceramic ball material 5. The method for manufacturing the ceramic ball material 5 is described with the case of using a silicon nitride sintered body as an example.

First, a sintering aid, additive, solvent, binder, and the like are added in appropriate quantities to silicon nitride as a raw material, then mixed, crushed, and granulated with a spray dryer. Through this process, the granulated powder is prepared as the raw material powder. When the total of the silicon nitride powder and the sintering aid powder is 100% by mass, the silicon nitride powder is preferably 85% by mass or more. The additive is a plasticizer. The solvent is water or an organic solvent. Examples of the organic solvent include alcohol, ketone, and benzene. The binder is an organic substance. The amount of the binder added is in the range of 3 to 20 parts by mass when the total of the silicon nitride powder and the sintering aid powder is 100 parts by mass.

Next, the average particle size of the resulting granulated powder is reduced. If the average particle size of the granulated powder is large, the granulated powder is likely to be crushed when the press mold is filled with the granulated powder, since a space is created between granulated powders. On the contrary, a smaller average particle size results in less space between granulated powders, making them less likely to be crushed. Therefore, reduction in the average particle size of the granulated powder makes it less likely to be crushed in the center of the press, where the pressure from the punch is smaller. However, if the average particle size of the granulated powder is simply reduced, the flowability of the granulated powder into the press mold decreases, which might affect the productivity. Therefore, it is necessary to reduce the average particle size without impairing the flowability of the granulated powder.

The granulated powder usually obtained with a spray dryer generally has a normal distributed, with the distribution concentrated around the average. By mixing two types of granulated powders having different particle sizes obtained by classification, therefore, it is possible to obtain a granulated powder having a smaller average particle size while minimizing the loss of flowability. For example, the average particle size of the granulated powder used in mold press molding is 50 to 150 μm, but it is possible to reduce the average particle size by classifying the granulated powder having an average particle size of 120 μm. The granulated powder is divided and classified using a 60-mesh sieve (aperture: approximately 250 μm) to obtain granulated powder smaller than 60 mesh. The rest of the divided granulated powder is classified with a 100-mesh sieve (aperture: approximately 150 μm) to obtain granulated powder smaller than 100 mesh. By mixing the granulated powder smaller than 60 mesh with the classified granulated powder smaller than 100 mesh at a certain ratio, it is possible to reduce the average particle size of the granulated powder from 120 μm to 90 μm, thereby making it easier to increase the maximum cross-sectional height Rtb of the roughness profile of the band-shaped portion 7 in the process described below.

Figure 1:
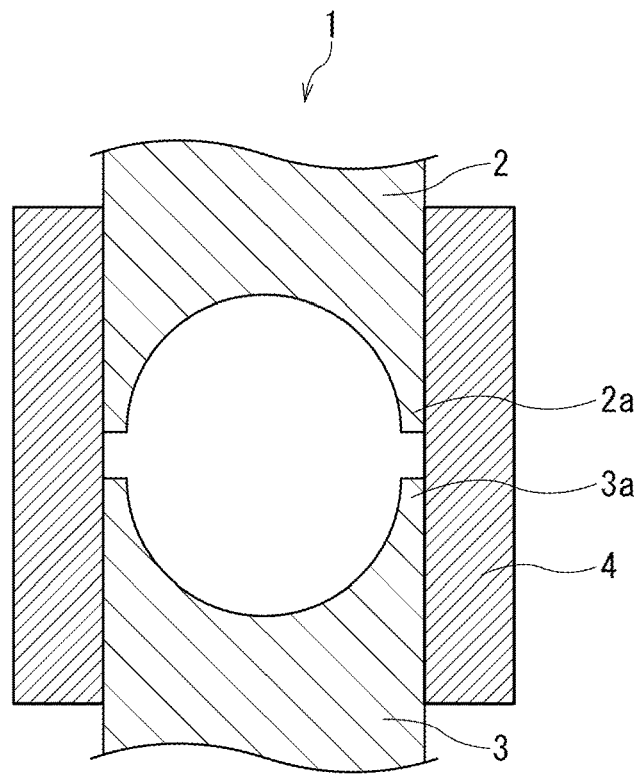
FIG. 1 is a cross-sectional view illustrating an example of a general mold press molding apparatus.
Figure 3:
FIG. 3 is an external view illustrating an example of a die of a mold press molding apparatus according to an embodiment.
Figure 3:
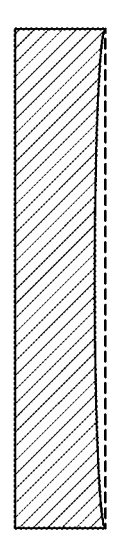
Figure 3:
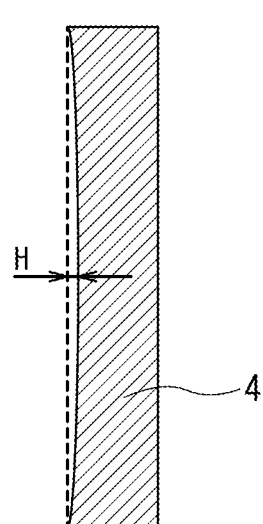

Next, press molding is performed using the prepared granulated powder, examples of which include a molding method using the upper punch 2, the lower punch 3, and the die 4 of the mold press molding apparatus as illustrated in FIG. 1. The spherical shape inside the punches becomes the spherical portion 6 of the ceramic ball material 5 by filling the granulated powder and applying pressure in the vertical direction to the upper punch 2 and the lower punch 3. The planar shape inside the tip 2a of the upper punch, the tip 3a of the lower punch, and the die 4 becomes the band-shaped portion 7 of the ceramic ball material 5. The inside of the cross section of the die 4 is straight, but is preferably slightly concave as illustrated in FIG. 3. If the depth of the concave portion is H, the size of H is preferably 0.01 mm or more and 0.10 mm or less. This concave portion prevents pressure from being applied to the band-shaped portion 7 of a green compact 13 and reduces the sintering density of the band-shaped portion 7 of the ceramic ball material 5 after sintering process, resulting in a larger maximum cross-sectional height Rtb of the roughness profile of the band-shaped portion. If the depth of H is less than 0.01, the effect of preventing pressure is limited. If the depth is more than 0.10 mm, the effect of preventing the pressure from being applied becomes large, but the load on the mold increases, may resulting in a shorter life of the mold.

By adjusting the shape of the tip 2a of the upper punch 2 and the tip 3a of the lower punch 3 at the time of press molding and the amount of powder filled, it is possible to adjust the width W and height of the band-shaped portion 7 of the ceramic ball material 5 after the sintering process. Similarly, the diameter in the direction of a spherical portion 14 and the diameter in the direction of a band-shaped portion 15 can be adjusted in the green compact 13. The green compact 13 obtained by press molding has the spherical portion 14 and the band-shaped portion 15. The spherical portion 14 and band-shaped portion 15 (illustrated in FIGS. 5 and 6) of the green compact 13 correspond to the spherical portion 6 and band-shaped portion 7 (illustrated in FIG. 2) of the ceramic ball material 5 described above, respectively.

It is also preferable to perform isostatic pressing on the green compact after the press molding. Through isostatic pressing, it is possible to uniformly apply compression to the granulated powder in the green compact, thereby reducing the remaining crushed granulated powder in the green compact. By reducing the remaining crushed granulated powder, it is possible to control the shrinkage rate in the sintering process.

Figure 4:
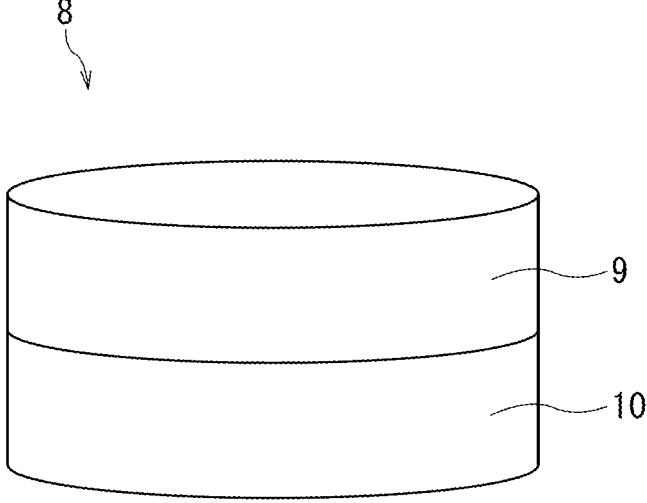
FIG. 4 is a cross-sectional view illustrating an example of cold isostatic pressing rubber molding according to an embodiment.
Figure 5:
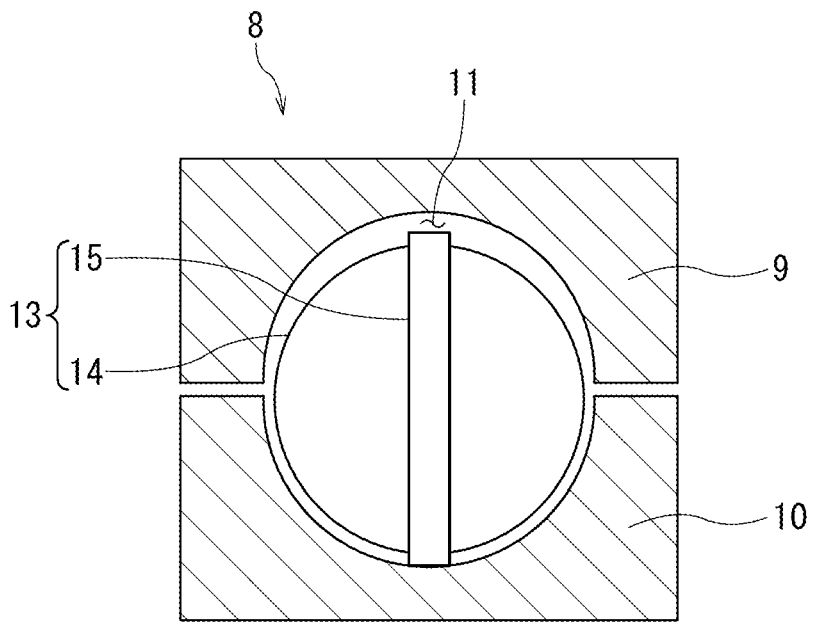
FIG. 5 is a cross-sectional view illustrating an example of a hole and a molded body laid in a cold isostatic pressing rubber molding according to an embodiment.
Figure 6:
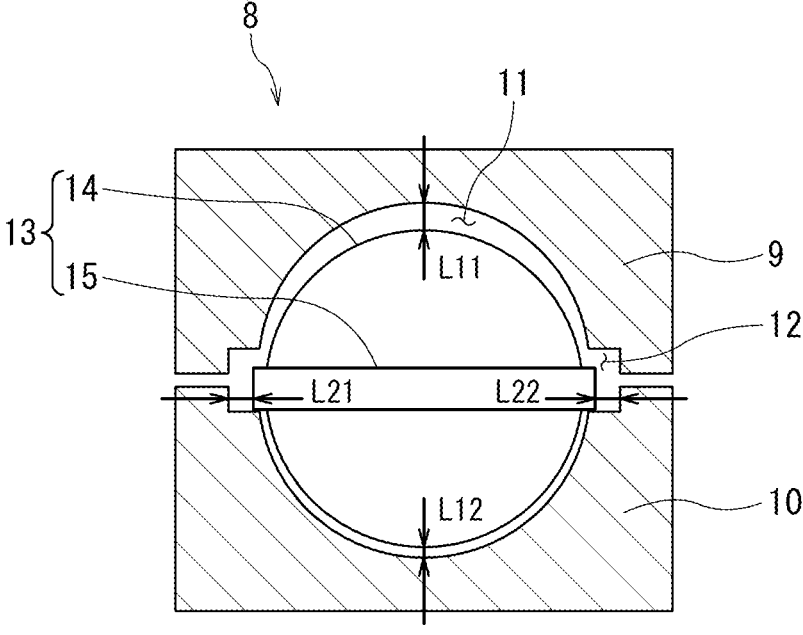
FIG. 6 is a cross-sectional view illustrating an example of a hole and a molded body laid in a cold isostatic pressing rubber molding according to an embodiment.

An isostatic pressing method using rubber dies is described as an example of isostatic pressing. FIG. 4 illustrates an example of a disk-shaped rubber die 8. In FIGS. 4 to 6, reference numerals 9 denotes an upper rubber die, 10 denotes a lower rubber die, 11 denotes a spherical portion space, 12 denotes a band-shaped portion space, 13 denotes a green compact, 14 denotes a spherical portion of the green compact, and 15 denotes a band-shaped portion of the green compact. FIG. 5 is a cross-sectional view illustrating an example in which the green compact 13 is placed in the spherical portion space 11 within the upper rubber die 9 and the lower rubber die 10.

The upper rubber die 9 and the lower rubber die 10 have hemispherical holes on both surfaces that are larger than the maximum diameter of the green compact 13 by about 1% or more and 35% or less. By placing the green compact 13 in the holes and overlapping the rubber dies, the green compact 13 is sealed in the spherical portion space 11 surrounded by the rubber dies. A hydrostatic pressure higher than the pressure at the time of forming is applied to the rubber dies. The rubber dies to be used preferably have a Shore hardness Hs of 30 or more and 50 or less. With the hardness of the rubber dies in this range, the rubber dies can have a deformability that allows uniform contact between the surface of the green compact 13 and the rubber dies, thereby making it possible to uniformly apply compression to the green compact 13. This process can reduce the remaining crushed granulated powder.

It is preferable to place the band-shaped portion 15 of the green compact 13 in the band-shaped portion space 12 with the upper rubber die 9 and the lower rubber die 10 having the band-shaped portion space 12 as illustrated in FIG. 6 to perform isostatic pressing. Reference character L1 denotes a distance between the upper rubber die 9 and the green compact 13 in the spherical portion space 11, and L2 denotes a distance between the upper rubber die 9 or the lower rubber die 10 and the green compact 13 in the band-shaped portion space 12. In this case, L1 is the sum of a distance L11 between the green compact 13 and the upper rubber die 9 and a distance L12 between the green compact 13 and the lower rubber die 10 (L11+L12). In addition, L2 is the sum of distances L21 and L22 (L21+L22) between the green compact 13 and the side surface of the band-shaped portion space 12 of the lower rubber die 10. At this point, if L1<L2, pressure is prevented from being applied to the band-shaped portion 15 of the green compact 13, making it possible to reduce the sintering density of the band-shaped portion 15, and the maximum cross-sectional height Rtb of the roughness profile of the ceramic ball material 5 after the sintering process is increased. If the band-shaped portion 15 can be accommodated, the band-shaped portion space 12 may be formed only in either of the upper rubber die 9 and the lower rubber die 10.

Conventionally, the distance between the green compact 13 and the rubber die is L1>L2 because the spherical portion space 11 formed by overlapping the upper rubber die 9 and the lower rubber die 10 has a true spherical shape (L1=L2). Another reason is that, according to the use, powder or the like is likely to adhere to the gap between the upper and lower rubber dies, resulting in L1>L2. In the case where the band-shaped portion space 12 is provided as illustrated in FIG. 6, L1<L2, and the load on the band-shaped portion 15 is reduced with respect to the spherical portion 14 of the green compact 13. Thus, the maximum cross-sectional height Rtb of the roughness profile of the band-shaped portion 7 of the ceramic ball material 5 after the sintering process becomes larger than the maximum cross-sectional height Rts of the roughness profile of the spherical portion 6, and Rtb/Rts becomes 1.0 or more.

Subsequently, a degreasing process is performed to degrease the green compact 13, in which the green compact 13 is heated at a temperature equal to or higher than the decomposition temperature of organic components such as binder to evaporate the organic components. The degreasing process may be performed in a nitrogen atmosphere or an air atmosphere. Through the degreasing process, a degreased compact can be obtained.

Next, a sintering process is performed to sinter the degreased compact. The sintering process is preferably performed at a temperature of 1,600° C. or more and 2,000° C. or less. The sintering process is preferably performed in a nitrogen atmosphere. The pressure during sintering is preferably in the range of atmospheric pressure or more and 300 MPa or less. Note that the atmospheric pressure is 0.10133 MPa (=1 atm). The sintered body obtained by the sintering process may be subjected to a hot isostatic pressing (HIP) treatment. Through this step, the ceramic ball material 5 can be obtained. The ceramic ball material 5 is a ceramic sintered body having a theoretical density of 98% or more.

A ceramic ball can be manufactured by polishing the ceramic ball material 5. A typical polishing process for balls is machining using surface plate. For example, the ceramic ball material 5 is inserted into a cavity between parallel upper and lower surface plates. By the movement of the polishing surface plates, the ceramic ball material 5 is machined using surface plate into a perfect spherical shape. The surface roughness of bearing balls is specified in ASTM F2094. Depending on the application, bearing balls are graded according to ASTM F2094 and polished to a surface roughness Ra according to that grade. As the grade increases, some bearing balls are polished to a mirror finish with a surface roughness Ra of 0.01 μm or less. Note that ASTM refers to standards published by ASTM International, formerly known as American Society for Testing and Materials (ASTM).

Since the maximum cross-sectional height Rtb of the roughness profile of the band-shaped portion 7 of the ceramic ball material 5 according to the embodiment is larger than that of the spherical portion 6, polishing is preferentially started. Since the sintering density of the band-shaped portion 7 is smaller than that of the spherical portion 6, machining using surface plate preferentially proceeds. Therefore, the machining using surface plate can be performed without paying attention to the contact of the band-shaped portion 7 with a grinding stone of, for example, a polishing surface plate, thereby preventing the ceramic ball material 5 from being damaged in the polishing process. In addition, the durability of the polishing surface plate can be improved. When the polishing rate is increased to shorten the polishing time, polishing processability (polishing efficiency) can be improved while maintaining the damage suppression effect.

Examples 1 to 9 and Comparative Examples 1 to 6

Sintering aids, additives, solvents, and binders were added to the raw ceramic powder, then mixed, crushed, and granulated with a spray dryer. The ceramics of Examples 1 to 7 and Comparative Examples 1 to 4 were silicon nitride sintered bodies. The ceramics of Example 8 and Comparative Example 5 were aluminum oxide sintered bodies. The ceramics of Example 9 and Comparative Example 6 were silicon carbide sintered bodies. The silicon nitride sintered bodies contained silicon nitride in an amount of 85% by mass or more. The aluminum oxide sintered bodies contained aluminum oxide in an amount of 85% by mass or more. The silicon carbide sintered bodies contained silicon carbide in an amount of 85% by mass or more. When the main component and a sintering aid were each 100 parts by mass, the amount of binder added was in the range of 3 to 20 parts by mass.

The granulated powder was then divided in two and classified with a 60-mesh sieve. The rest of the divided granulated powder was classified with a 100-mesh sieve. The granulated powder classified by 60 mesh was mixed with the 60-mesh granulated powder classified by 100 mesh to obtain a granulated powder.

Next, press molding was performed using the resulting granulated powder, which was die forming using the upper and lower dies of a mold press molding apparatus as illustrated in FIG. 1. The press molds were made to have the same clearance for molds with the same diameter of the ceramic ball, and straight molds without concave portions in the center of the die 4 and molds with concave portions were used. The die forming was followed by isostatic pressing, which involved the use of a disk-shaped rubber die having a Shore hardness Hs of 30 or more and 50 or less. The rubber die 8 prepared was a rubber die (L1=L2) with a spherical shape in which the distance L1 between the upper rubber die 9 and the ceramic ball material 5 in the spherical portion space 11 and the distance L2 between the upper rubber die 9 or the lower rubber die 10 and the green compact 13 in the band-shaped portion space 12 were equal to each other. A rubber die (L1<L2) provided with the band-shaped portion space 12 is also prepared. At this point, L1/L2, a ratio of the distance L1 to the distance L2 of the rubber die provided with the band-shaped portion space 12, was 1.05. The press molds were placed such that the band-shaped portion 15 of the green compact 13 was perpendicular to the cylindrical direction of the rubber dies. In the case of a rubber die having the band-shaped portion space 12, the band-shaped portion 15 was placed in the band-shaped space. In this state, a hydrostatic pressure higher than the pressure at the time of forming was applied in the process of isostatic pressing.

Next, after a degreasing process, a sintering process was performed at 1,600° C. to 2,000° C. at atmospheric pressure in a nitrogen atmosphere, followed by HIP treatment at 1,600° C. to 2,000° ° C. at a pressure of 200 MPa in a nitrogen atmosphere.

Through this process, the ceramic ball material 5 according to the examples was produced. In Comparative Example, 100-mesh granulated powder was not mixed (0% mixing ratio), and only 60-mesh mixed powder was used. In Comparative Examples, the die 4 was not provided with the concave portion illustrated in FIG. 3. In Comparative Examples, a rubber die having the band-shaped portion space 12 was not used.

Table 1 shows the manufacturing conditions for Examples and Comparative Examples.

TABLE 1

| | Ceramic Ball Material | | | |
| --- | --- | --- | --- | --- |
| | Type of Sintered Body | Diameter after Polishing Process [inch] | Diameter before Polishing Process [mm] | Width of Band-Shaped Portion [mm] |
| Example 1 | Si$_3$N$_4$ | 3/8 | 10.5 | 1.5 |
| Example 2 | Si$_3$N$_4$ | 3/8 | 10.5 | 1.5 |
| Example 3 | Si$_3$N$_4$ | 3/8 | 10.5 | 1.5 |
| Example 4 | Si$_3$N$_4$ | 3/8 | 10.5 | 1.5 |
| Example 5 | Si$_3$N$_4$ | 7/8 | 23.8 | 2.5 |
| Example 6 | Si$_3$N$_4$ | 1 3/16 | 32.0 | 3.0 |
| Example 7 | Si$_3$N$_4$ | 1 7/8 | 49.6 | 3.2 |
| Example 8 | Al$_2$O$_3$ | 3/8 | 10.5 | 1.5 |
| Example 9 | SiC | 3/8 | 10.5 | 1.5 |
| Comparative Example 1 | Si$_3$N$_4$ | 3/8 | 10.5 | 1.5 |
| Comparative Example 2 | Si$_3$N$_4$ | 7/8 | 23.8 | 2.5 |
| Comparative Example 3 | Si$_3$N$_4$ | 1 3/16 | 32.0 | 3.0 |
| Comparative Example 4 | Si$_3$N$_4$ | 1 7/8 | 49.6 | 3.2 |
| Comparative Example 5 | Al$_2$O$_3$ | 3/8 | 10.5 | 1.5 |
| Comparative Example 6 | SiC | 3/8 | 10.5 | 1.5 |

| | Mixing Ratio of 100-Mesh Granulated Powder [%] | Depth H of Die Concave Portion [mm] | Distances Between Rubber dies and Green Compact |
| --- | --- | --- | --- |
| Example 1 | 50 | 0.04 | L1 < L2 |
| Example 2 | 25 | 0.00 | L1 = L2 |
| Example 3 | 0 | 0.02 | L1 = L2 |
| Example 4 | 0 | 0.04 | L1 < L2 |
| Example 5 | 25 | 0.06 | L1 = L2 |
| Example 6 | 75 | 0.00 | L1 < L2 |
| Example 7 | 0 | 0.08 | L1 < L2 |
| Example 8 | 50 | 0.04 | L1 < L2 |
| Example 9 | 50 | 0.04 | L1 < L2 |
| Comparative Example 1 | 0 | 0.00 | L1 = L2 |
| Comparative Example 2 | 0 | 0.00 | L1 = L2 |
| Comparative Example 3 | 0 | 0.00 | L1 = L2 |
| Comparative Example 4 | 0 | 0.00 | L1 = L2 |
| Comparative Example 5 | 0 | 0.00 | L1 = L2 |
| Comparative Example 6 | 0 | 0.00 | L1 = L2 |

Examples 1 to 4, 8, and 9 and Comparative Examples 1, 5, and 6 were each a ceramic ball material 5 for ceramic balls to be formed into 3/8 inches (9.525 mm) after the polishing process. Example 5 and Comparative Example 2 were each a ceramic ball material 5 for ceramic balls of 7/8 inches (22.225 mm). Example 6 and Comparative Example 3 were each a ceramic ball material 5 for ceramic balls of 1 to 3/16 inches (30.165 mm). Example 7 and Comparative Example 4 were each a ceramic ball material 5 for ceramic balls of 1 to 7/8 inches (47.625 mm). The ceramic ball materials 5 of Examples 1 to 9 and the ceramic ball materials of Comparative Examples 1 to 6 could all be used as beating balls.

The maximum cross-sectional height Rt of the roughness profile of the ceramic ball material 5 according to Examples and the maximum cross-sectional height Rt of the roughness profile of the ceramic ball material according to Comparative Examples were each measured at the evaluation length U. The respective measurement methods were as described above. The maximum cross-sectional height Rt of the roughness profile was, as described above, the sum of the maximum profile peak height and the maximum profile valley depth at the evaluation length U. In addition, Rtb/Rts was calculated for each of the ceramic ball materials 5 according to Examples and the ceramic ball materials according to Comparative Examples. The maximum cross-sectional heights Rtb and Rts, the ratio Rtb/Rts, and the evaluation length U of the roughness profiles in Examples and Comparative Examples are as shown in Table 2.

Comparative Examples 1 to 6 each had a ratio Rtb/Rts of less than 1.0, i.e., out of the range, where Rtb denotes the maximum cross-sectional height of the roughness profile of the band-shaped portion of the ceramic ball material; and Rts denotes the maximum cross-sectional height of the roughness of the spherical portion.

The ceramic ball materials 5 of Examples and the ceramic ball materials of Comparative Examples were used to evaluate the polishing accuracy (e.g., non-defective percentage of de-burring) and the damage suppression effect (e.g., percentage of material chipping defects). The evaluation was made by fixing polishing conditions for polishing each ceramic ball material using a ball processing polishing machine and then examining the processed state of the band-shaped portion. The polishing conditions were as follows: no pressure was applied to the upper surface plate, the lower surface plate was rotated, and an abrasive using glycerin as a lubricant was supplied to diamond to perform polishing for 24 hours. The ceramic balls of the same size were used under the same conditions of the gap distance from the upper surface plate, the number of the lower surface rotations, the quantity of ceramic ball materials to be fed, and the amount of the abrasive to be supplied. After the polishing process, 100 pieces were sampled and visually inspected for band-shaped portions, and those in which band shape could not be observed were regarded as non-defective and expressed as a non-defective percentage of de-burring (%).

After the above polishing process, the rate of occurrence of defects in the form of chipped ceramic ball materials 5 of Examples and chipped ceramic ball materials of the Comparative Examples were examined. The defect rate was calculated by visually inspecting one batch of the 100 samples using an optical microscope, and the rate of chipping occurred was indicated as the percentage of material chipping defects (%). Table 2 shows the results.

TABLE 2

| | U [mm] | Rtb [μm] | Rts [μm] | Rtb/Rts | Non-Defective Percentage of De-Burring [%] | Percentage of Material Chipping Defect [%] |
|---|---|---|---|---|---|---|
| Example 1 | 1.5 | 8.8 | 5.3 | 1.66 | 100 | 0 |
| Example 2 | 1.5 | 5.6 | 5.3 | 1.06 | 100 | 4 |
| Example 3 | 1.5 | 5.5 | 5.3 | 1.04 | 100 | 1 |
| Example 4 | 1.5 | 5.8 | 5.2 | 1.12 | 100 | 3 |

TABLE 2-continued

| | U [mm] | Rtb [μm] | Rts [μm] | Rtb/Rts | Non-Defective Percentage of De-Burring [%] | Percentage of Material Chipping Defect [%] |
|---|---|---|---|---|---|---|
| Example 5 | 3.0 | 7.7 | 5.9 | 1.31 | 100 | 1 |
| Example 6 | 5.0 | 8.1 | 6.4 | 1.27 | 100 | 0 |
| Example 7 | 10.0 | 9.8 | 7.8 | 1.26 | 100 | 1 |
| Example 8 | 1.5 | 7.3 | 5.1 | 1.43 | 100 | 0 |
| Example 9 | 1.5 | 9.4 | 4.5 | 2.09 | 100 | 1 |
| Comparative Example 1 | 1.5 | 5.2 | 5.3 | 0.98 | 96 | 8 |
| Comparative Example 2 | 3.0 | 5.7 | 5.9 | 0.97 | 93 | 9 |
| Comparative Example 3 | 5.0 | 6.1 | 6.4 | 0.95 | 95 | 10 |
| Comparative Example 4 | 10.0 | 7.2 | 7.8 | 0.92 | 96 | 9 |
| Comparative Example 5 | 1.5 | 4.5 | 5.1 | 0.88 | 98 | 5 |
| Comparative Example 6 | 1.5 | 4.5 | 4.6 | 0.98 | 91 | 7 |

In the ceramic ball materials according to Comparative Examples 1 to 6, the non-defective percentage of de-burring and the percentage of material chipping defects were improved to some extent at a relatively low polishing speed, while the non-defective percentage of de-burring and the percentage of material chipping defects were not favorable at a relatively high polishing speed as shown in Table 2. On the other hand, as can be seen from Table 2, in the ceramic ball materials 5 according to Examples 1 to 9, the non-defective percentage of de-burring and the percentage of material chipping defects were improved compared to the ceramic ball materials according to Comparative Examples 1 to 6 even at a relatively high polishing speed, resulting in an improvement in polishing accuracy and damage suppression effect. That is, it can be concluded that in the ceramic ball materials 5 according to Examples 1 to 9, the polishing processability of the band-shaped portion 7 was improved as well as the polishing accuracy and the damage suppression effect. In other words, the ceramic ball materials 5 according to Examples 1 to 9 could shorten the polishing time.

A case where the ceramic ball material 5 is a boron nitride sintered body or a zirconium oxide sintered body is not illustrated as an example. However, if the ceramic ball material 5 satisfies at least the condition of the ratio Rtb/Rts, it is considered to be superior in polishing processability and damage suppression compared with Comparative Examples, similarly to the case of the aluminum oxide sintered body, the silicon nitride sintered body, and the silicon carbide sintered body.

As described above, the ceramic ball material 5 can improve the polishing processability of ceramic materials during polishing and suppress damages during polishing.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A ceramic ball material comprising:

a spherical portion; and a band-shaped portion formed over a circumference of a surface of the spherical portion, wherein the ceramic ball material has a ratio $R_{tb}/R_{ts}$ of 1.0 or more, where $R_{tb}$ denotes a maximum cross-sectional height of a roughness profile on an outer peripheral surface of the band-shaped portion; and $R_{ts}$ denotes a maximum cross-sectional height of roughness on an outer peripheral surface of the spherical portion.

2. The ceramic ball material according to claim 1, wherein the spherical portion has an arbitrary diameter of 0.5 mm or more.

3. The ceramic ball material according to claim 1, wherein the ceramic ball material comprises any one of an aluminum oxide sintered body, a silicon nitride sintered body, a silicon carbide sintered body, a boron nitride sintered body, and a zirconium oxide sintered body.

4. The ceramic ball material according to claim 1, wherein the ceramic ball material comprises a ceramic sintered body containing 85 mass % or more of silicon nitride.

5. A method for manufacturing a ceramic ball, comprising polishing the ceramic ball material according to claim 1.

6. A ceramic ball obtained by polishing the ceramic ball material according to claim 1.

7. The ceramic ball according to claim 6, wherein the ceramic ball material has a surface roughness $R_a$ of 0.01 μm or less.

* * * * *